United States Patent [19]

Nolte

[11] 4,191,805
[45] Mar. 4, 1980

[54] METHOD OF FORMING A LAYER OF MATERIAL FROM A SOLUTION

[75] Inventor: Hans-Henning Nolte, Gelsenkirchen, Fed. Rep. of Germany

[73] Assignee: BFG Glassgroup, Paris, France

[21] Appl. No.: 832,614

[22] Filed: Sep. 12, 1977

[30] Foreign Application Priority Data

Sep. 24, 1976 [GB] United Kingdom .............. 39782/76

[51] Int. Cl.² ..................... B32B 9/04; B32B 31/00
[52] U.S. Cl. ..................................... 428/539; 34/12; 156/87; 156/245; 156/102; 156/246; 210/500 M; 264/86; 264/87; 427/372 B; 428/920; 428/921; 428/432
[58] Field of Search ............... 156/87, 245, 102, 246; 427/372 B; 428/539, 921, 920, 432; 159/47 R; 34/12, 15; 264/86, 102, 87; 210/65, 500 M; 260/2.1 R

[56] References Cited

U.S. PATENT DOCUMENTS

| | | | |
|---|---|---|---|
| 2,383,694 | 8/1945 | Steiner | 34/12 |
| 2,894,855 | 7/1959 | Wilhelm et al. | 156/87 |
| 3,112,235 | 11/1963 | Blanchard | 156/310 |
| 3,238,078 | 3/1966 | Baldwin | 156/87 |
| 3,259,536 | 7/1966 | Gaeth et al. | 428/921 |
| 3,342,729 | 9/1967 | Strand | 210/500 M |
| 3,641,229 | 2/1972 | Lawrence et al. | 264/86 |
| 3,686,116 | 8/1972 | Rio | 210/500 M |
| 3,762,566 | 10/1973 | Del Pico | 210/500 M |
| 3,763,055 | 10/1973 | White et al. | 210/500 M |
| 3,767,502 | 10/1973 | Ishii et al. | 210/500 M |
| 3,864,289 | 2/1975 | Randall | 210/500 M |
| 3,974,316 | 8/1976 | Jacquemin et al. | 428/539 |

FOREIGN PATENT DOCUMENTS

804756 11/1958 United Kingdom ..................... 264/86
933410 8/1963 United Kingdom .

*Primary Examiner*—John T. Goolkasian
*Assistant Examiner*—J. J. Gallagher
*Attorney, Agent, or Firm*—Cushman, Darby & Cushman

[57] ABSTRACT

A method of forming a layer of material from a solution containing the material and a solvent which comprises the steps of forming the solution into a layer, contacting at least one major face of the solution layer with a wall which is permeable over the area of that face substantially to the vapor phase only of the solvent, and effecting the escape of solvent simultaneously from both major faces of the layer including the one major face by vapor diffusion through the wall so as to set the layer.

22 Claims, 9 Drawing Figures

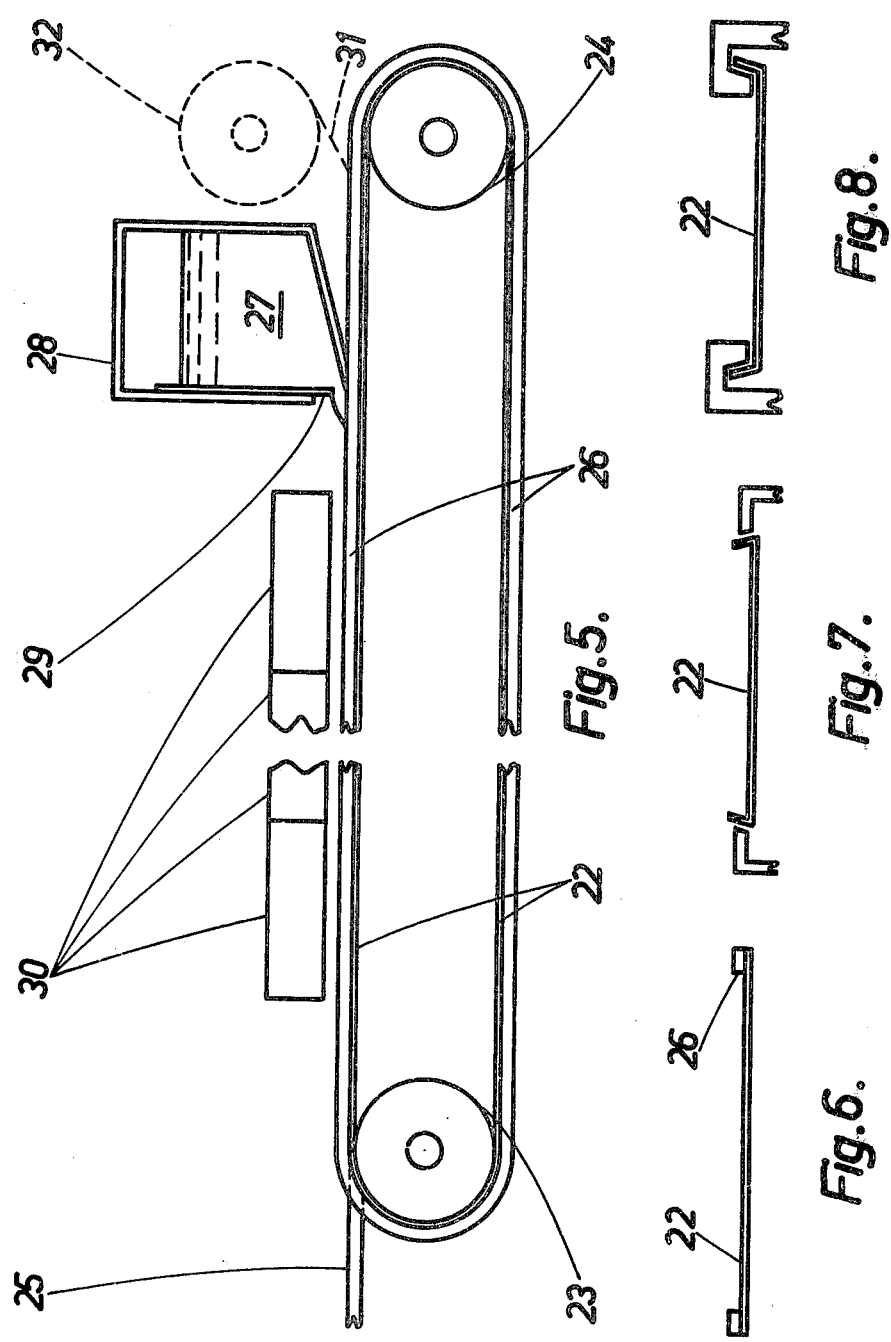

METHOD OF FORMING A LAYER OF MATERIAL FROM A SOLUTION

This invention relates to the formation of layers of material from a solution thereof by forming the solution into a layer and causing or allowing solvent to escape from such layer to effect setting.

The expression "solution" is used herein to denote true solutions and colloidal solutions, and accordingly, references herein to "solvent" and "solute" should be understood as including references to liquid dispersion medium and disperse phase, respectively, unless the context otherwise requires. The invention has particular, but not exclusive, reference to the formation of layers which are not self-sustaining on temporary supports for subsequent transfer to one or more permanent supports.

According to the present invention as boardly defined, there is provided a method of forming a layer of material from a solution containing the material and a solvent by forming the solution into a layer, contacting at least one major face of the solution layer with a wall which, over the area of that face, is permeable substantially by the vapor phase only of the solvent and effecting the escape of solvent simultaneously from both major faces of the layer including the one major face by vapor diffusion through the wall.

Such a method has the advantage of enabling a very uniform layer to be formed. Moreover, manufacture and handling of the layer can be facilitated.

When forming a layer from a solution, a particular advantage afforded by using a wall which is permeable substantially by the vapor phase only of the solvent (which property will hereinafter be referred to as semi-permeability) is that such vapor can be drawn off through the wall, for example, by subjecting the outer face of the wall to low pressure or a vacuum. This will assist in setting the layer and will promote the formation of a good and uniform quality layer. The wall material must be substantially impervious to the liquid to provide an interface at which evaporation can take place and should, of course, be insoluble in and resistant to chemical attack by the solvent. The wall material should also be readily separable from the set layer, though as will be explained below, this is not always essential.

Preferably, the wall is a wall of a mold. This enables the formation of a layer with well-defined edges.

Advantageously, the wall comprises a semi-permeable film which is held substantially rigid by a vapor-permeable support during setting of the layer. Such a film can subsequently simply be peeled away from the set layer.

Preferably, there is a support which is rigid since this facilitates holding the wall stably during setting of the layer. Such a support may, for example, be a sintered metal or porous plastic plate.

In some embodiments of the invention, the film is adherent to the support; for example, a sintered metal plate may be faced with an adherent semi-permeable plastic film. In preferred embodiments of the invention, after setting of the layer, the film is detached from the support with the layer. In this way, the film can provide some measure of protection for the surface of the layer prior to any further manufacturing step, such as assembling the layer between a pair of supporting sheets.

Advantageously, the film is formed from a plastic material, a rubber or paper which has been treated to ensure its semi-permeability. Such materials are very convenient to use in practice. Preferably, the film is formed from a polymer containing hydrophilic group since this enhances the permeability of the film by water vapor. Also advantageously, the polymer is selected from the group consisting of cellulose hydrate, cellulose butyrate, cellophane, polyvinyl alcohol, acetyl cellulose, ethyl cellulose and polydialkylsiloxane.

One particular use envisaged for the present invention lies in the formation of layers of intumescent material for sandwiching between sheets of which at least one supports the layer in order to form a fire-screening glazing panel. Such an intumescent layer may, for example, be formed from an aqueous solution of hydrated sodium silicate.

According to the known literature, cellulose and cellulose derivatives, e.g. cellulose hydrate and Cellophane ®, are sensitive to moisture in that they swell and stretch locally and they are also very sensitive to the presence of strong alkalis. It would, therefore, seem that such materials would be a very poor choice for forming a semi-permeable film, especially for forming layers of hydrated sodium silicate. This is surprisingly not the case. Excellent results have been achieved using a semi-permeable film of cellulose hydrate for forming layers of hydrated sodium silicate. Acetyl cellulose has also be used. The other polymers recited can also give good results.

Preferably, the outer face of the wall is subjected to reduced pressure to assist the layer to set. Such reduced pressure forces evaporation of the solvent at the inner face of the wall and so promotes uniform setting of the layer which is particularly advantageous as regards the quality of the layer formed. Also, setting is thereby speeded up. In some preferred embodiments of the invention, the layer is formed as a sheet. For example, the solution can simply be poured into a tray-like mold.

In embodiments of the invention in which the outside of the mold having a single wall is subjected to reduced pressure, the method according to the invention is preferably one in which the mold is immersed in a bath of solution and a reduced pressure is applied to the outer face of the wall to cause solvent vapor to migrate through the wall while it is immersed in the bath whereby a layer of solute material is deposited on the wall. The mold and layer thus formed can then be removed from the bath so that setting can be completed.

Advantageously, the layer is formed as a continuous web. There are several ways in which this can be done in accordance with the invention. In one method, the solution is applied onto an upper generally horizontally travelling reach of an endless belt where setting of the layer is effected prior to cutting the continuous web thus formed into sheets. A semi-permeable film web is preferably fed onto the conveyor before the solution is applied so that this film web rather than the conveyor or belt per se forms the base of the layer mold.

Preferably, the belt is provided with dams defining side walls of a continuous mold. In order to confer the desired uniformity of the layer while it is setting, the upper reach of the belt is preferably held rigid by tensioning. Alternatively, or in addition, it is preferred that the upper reach of the belt should travel over a rigid plate which supports it.

In another continuous process according to the invention, two film webs, of which at least one is semipermeable, are drawn off and sealed together at their end and along each side to form a tubular mold. The solution is introduced into the tubular mold which is drawn down an incline to maintain a head of fluid and between two parallel support members. The main walls of the tubular mold are held against the parallel support members by the internal pressure in the mold due to the head of fluid. The speed of advance of the mold and the length of the support members are such that the setting of the layer is substantially complete when the layer exits from between the support members. Advantageously, the support members define a horizontal path for the mold.

As has been stated, the invention is very suitable for the formation of layers of intumescent material, especially layers comprising a hydrated metal salt such as sodium silicate. The invention includes a layer formed by a method as herein described and extends to a method of manufacturing a fire-screening glazing panel comprising at least one layer of intumescent material held between two plies of which at least one supports the layer in which the layer is formed by a method as herein described and is assembled between the two plies. The various plies of such a panel are preferably bonded together so as to form a true laminate.

It is not always necessary to strip off the polymeric film in cases where this is used; indeed, in some embodiments, the film is made from a material which can be used to bond a ply to the layer. If desired, several successive layers can be transferred onto a support by a method according to the invention in order to obtain an increased thickness of the material. Heat may be applied to the layer to speed setting.

The invention will now be described in greater detail with reference to the accompanying diagrammatic drawings which illustrate various embodiments of the invention by way of example and in which:

FIG. 5 is a view of an endless belt conveyor molding apparatus;

FIGS. 6 to 8 are cross-sectional views through conveyor belts showing various edge-dam configurations.

Figure 1:
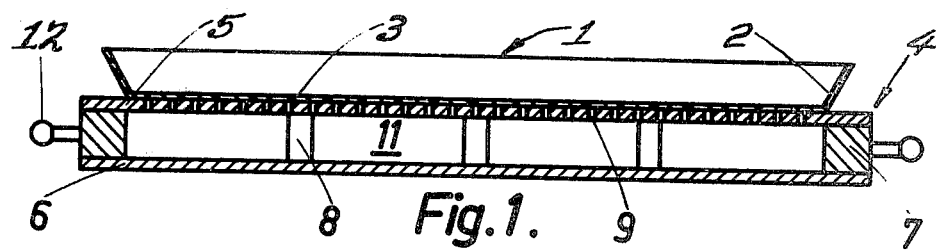
FIG. 1 is a cross-sectional view of a tray mold and air-box support.

In FIG. 1, a mold 1 formed of flexible, semipermeable, plastic material has peripheral walls 2 and a base 3 which is held by an air-box support 4.

Figure 2:
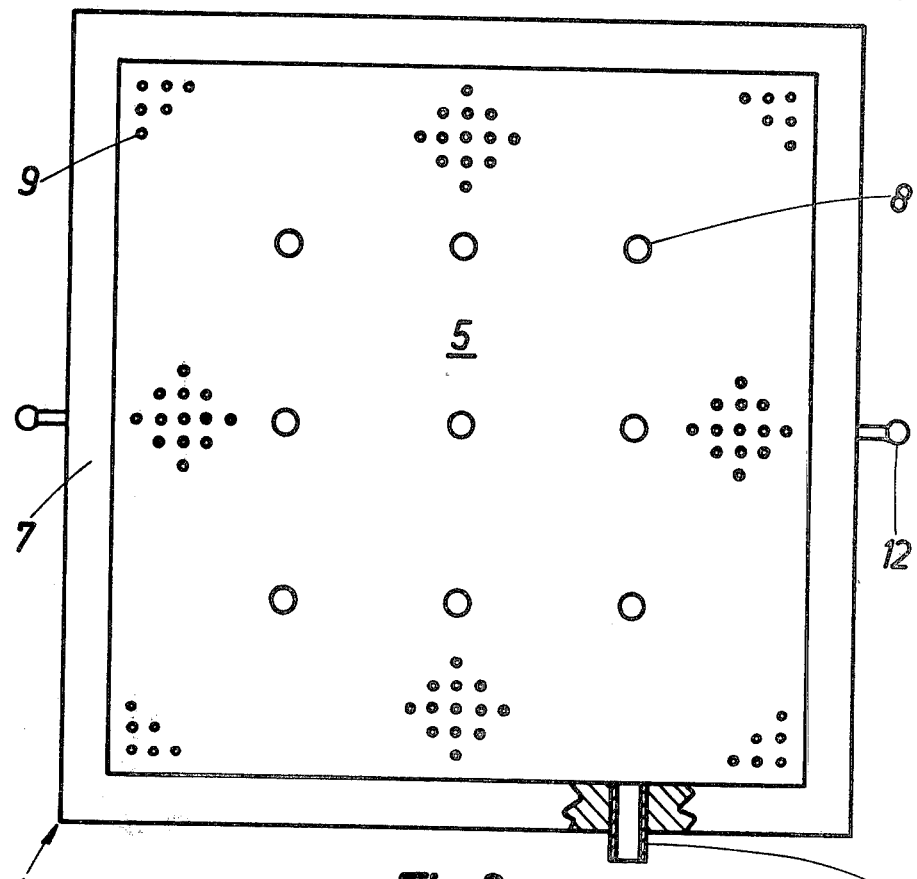
FIG. 2 is a view from below of the support of FIG. 1 with the bottom wall of the air-box support removed.

As best shown in FIG. 2, the air-box support 4 comprises a front supporting plate 5 spaced from a rear face plate 6 by a peripheral wall 7 and internal spacers 8. The front supporting plate 5 is perforated with holds 9 and a pipe 10 is provided for connection to a vacuum pump (not shown) so that the interior 11 of the air-box 4 can be subjected to low pressure whereby the mold base 3 will be held rigidly against the supporting plate 5 of the air-box support 4. Trunnions, as indicated at 12, are provided for the handling of the air-box support 4.

In use, pressure in the interior 11 of the air-box support 4 is reduced so that the base 3 of the mold 1 is held firmly against the perforated supporting plate 5 and the solution for forming the layer is simply poured into the mold where it is confined on the base 3 by peripheral walls 2. The plastic material of which the mold is formed must, of course, be chemically stable for the solution used.

The setting of the layer is then effected. In order to speed up setting of the layer, the mold and support may be placed inside a heating chamber and/or a chamber in which reduced pressure can be obtained so as to force evaporation of the solvent. In cases where such reduced pressure is applied, care must be taken to ensure that the pressure in the interior 11 of the air-box support 4 is lower than that outside so as to maintain rigidity of the base 3 of the mold.

The mold 1 is formed of a semi-permeable material. Vapor from the solvent for the layer forming material can thus diffuse through the wall constituting the base of the mold and into the air-box support 4 where it is sucked away.

When the layer in the mold has set, a permanent support for the layer (if such is necessary), e.g. a sheet of glass, may be laid on top of it. Bonding material may be interposed between the permanent support and the layer if this is necessary or desired. This assembly of permanent support, layer, mold and mold support may then be turned upside down about the trunnions 12 and the pressure in the interior 11 of the air-box support 4 can be restored so that the mold is no longer held against the supporting plate 5. The permanent support (not shown) which now carries the layer and the mold can then be removed and the mold 1 can be peeled away from the layer. Alternatively, the mold may be left on the layer as a protection pending some further step in a manufacturing process.

In a variant embodiment, the perforated support plate 5 is replaced by a porous support plate, e.g., of sintered metal or plastic material.

Figure 3:
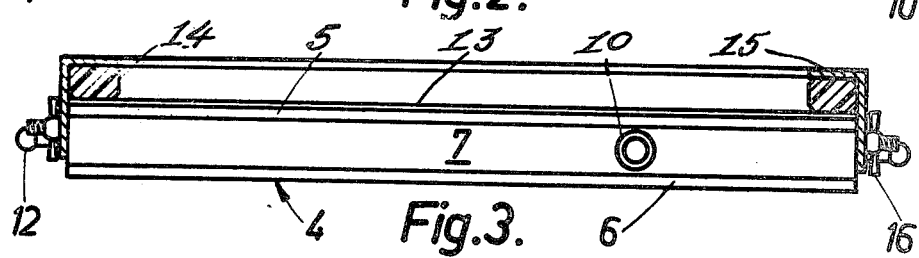
FIG. 3 is a partly cross-sectional view of an alternative form of tray mold and support.

FIG. 3 shows an alternative form of mold supported by an air-box support 4 similar to that just described. In this embodiment, the base of the mold is separated from its walls. The mold base is formed of a semi-permeable film 13, e.g. a plastic or plastic-coated paper web, and the walls are formed of one or more bodies 14 which may, for example, be of silicone rubber. These mold walls 14 are shown held in place by angle section metal members, as indicated at 15, attached to the peripheral wall 7 of the air-box support 4 using wing-nuts 16.

The molding process may be exactly the same as that described above but, in this case, after setting of the layer, it is preferable to remove the metal members 15 and the side walls 14 of the mold before applying a permanent support to the layer.

This embodiment of the invention is especially suitable for making fire-screening glazing panels comprising a layer of intumescent material bonded between two vitreous sheets. For example, a layer of hydrated sodium silicate can be formed from a solution having the following properties:

| Proportion by weight | $SiO_2:Na_2O$ | 3.3 to 3.4 |
| --- | --- | --- |
| density | 37° to 40° Baume | |
| viscosity | 0.2 poiseuille | |

Such a solution can be poured into a supported mold whose base 13 is water vapor permeable to give the required thickness of layer (e.g., 0.3 to 5 mm) and setting of this layer can be effected by placing it in a drying chamber where it can be heated to say 30° C. to 90° C. under controlled humidity conditions. The drying chamber atmosphere may, for example, be maintained at 35° C. and 50% relative humidity. Drying also takes place by diffusion of water vapor through the semipermeable film 13 into the air-box support 4. Such a film may, for example, be 25μ to 40μ thick. When set, a first sheet, e.g. of glass, can be bonded to the molded layer (after removal of the mold side walls) using sodium silicate solution or in any other known manner, and the air-box support 4 can then be removed to leave the glass sheet as a permanent support for the molded layer. The plastic film 13 can be peeled away from the molded layer and the second glass sheet may then be bonded to the layer.

A particular advantage is afforded by this process when it is desired to apply more than one layer of the material to a permanent support. In such cases, considered again with special reference to laminated fire-screening glazing panels, a first layer, e.g. of hydrated sodium silicate, can be applied to a glass sheet followed by a polyvinyl butyral film and a second similar layer and film can then be applied to the first, followed by a second glass sheet. The whole assembly can then be bonded together in a single process to give a panel having successive plies of glass, hydrated sodium silicate, polyvinyl butyral, hydrated sodium silicate, polyvinyl butyral and glass.

This is particularly advantageous construction for fire-screening panels because, on the outbreak of fire on one side, the hydrated sodium silicate on that side of the panel will intumesce and intumescence of the other layers will be delayed until intumescence of the first layer is substantially complete. This allows the side of the panel remote from the fire to remain cooler for a longer time and also militates against any local hot spots on that side, thus reducing the risk that the glass sheet there will be broken by thermal shock.

Figure 4:
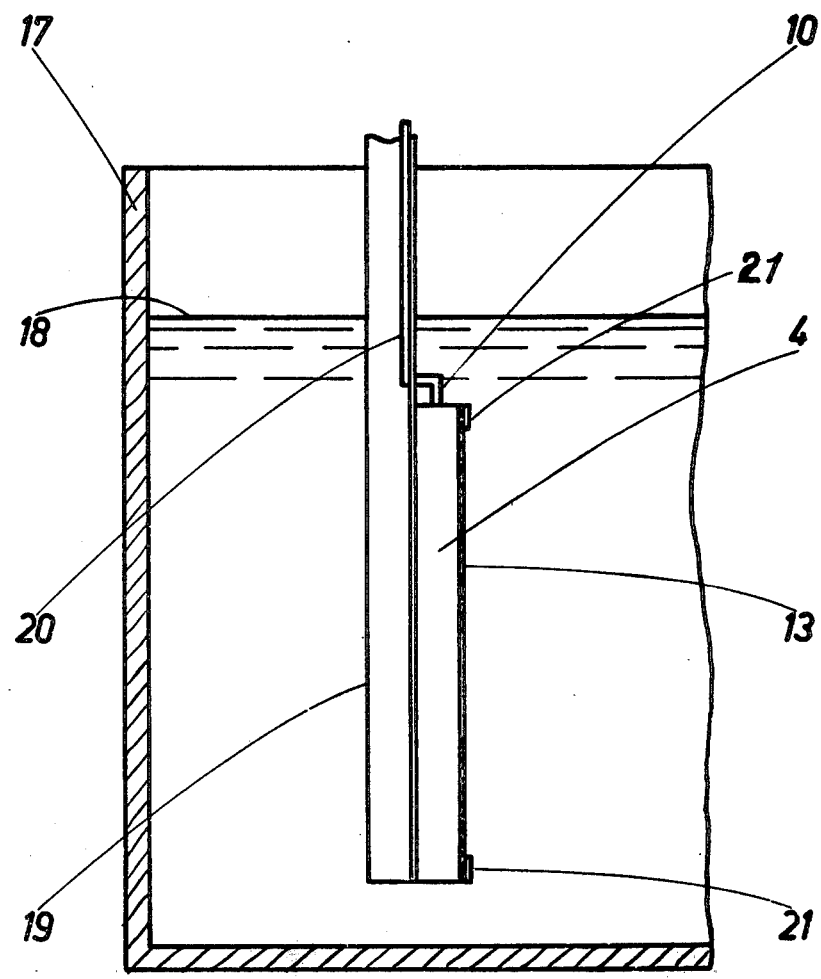
FIG. 4 is a partly cross-sectional view of a bath of fluid layer forming material in which a mold is immersed.

FIG. 4 shows an embodiment of apparatus where a layer is formed within a bath 17 containing a solution of layer forming material whose surface is shown at 18. In this embodiment, an air-box support 4 such as has already been described is mounted on a beam 19, e.g. of T-section for movement into and out of the bath. The air-box support 4 is surfaced as before with a vapor permeable plastic film 13 and, in use, it is simply lowered into the bath and its interior is subjected to low pressure by connection to a vacuum pump (not shown) via pipes 10 and 20.

The reduction of pressure in the air-box support 4 promotes a flow of water vapor diffusing through the film 13 so that the concentration of the suspended particles or solute will be increased in the immediate neighborhood of the film and a layer of solid material will rapidly be built up against the film.

When the desired layer thickness has been achieved, the assembly can be withdrawn from the bath and further operations can be performed on the layer as described above.

In a variant of this embodiment, two such air-box supports 4 are lowered into the bath. The arrangement is such that their two film covered surfaces face one another. Distance pieces 21 surround the film 13 to define the thickness of the layer produced.

FIG. 5 illustrates a continuous molding process. A conveyor belt 22 is supported between spaced rolls 23,24 so that it has a generally horizontal upper reach which, in operation, runs towards the left of the Figure where there is provided a table 25. Part of the table extends as close as possible to the conveyor belt 22 so that it is substantially continuous with the upper reach of the conveyor.

The conveyor belt 22 is tensioned so that its upper reach forms a substantially rigid smooth surface. If desired, a support (not shown) may be provided for the upper reach. Dams 26 (also shown in FIG. 6) are provided at the edges of the conveyor belt to define edges of the mold.

Fluid layer forming material is introduced to the conveyor belt 22 towards the upstream end of its upper reach. There are many ways in which this can be done. In the embodiment shown, such material (indicated at 27) is held in a container 28 having an adjustable gate 29 so that the material 27 can simply flow onto the conveyor belt 22 at the desired rate. A bank of heating devices 30 assists in causing the layer formed on the conveyor belt to set before it is transferred to the table 25.

The layer forming material is applied to a semipermeable film 31 drawn from a roll 32.

If desired, the table 25 may be constituted as an air flotation device so as to reduce friction.

The continuous ribbon molded in this way may be cut into sheets on the table 25 and, if required, may be applied to permanent supports, e.g. sheets of glass.

FIGS. 7 and 8 are cross-sections through other conveyors showing alternative edge forms.

Figure 9:
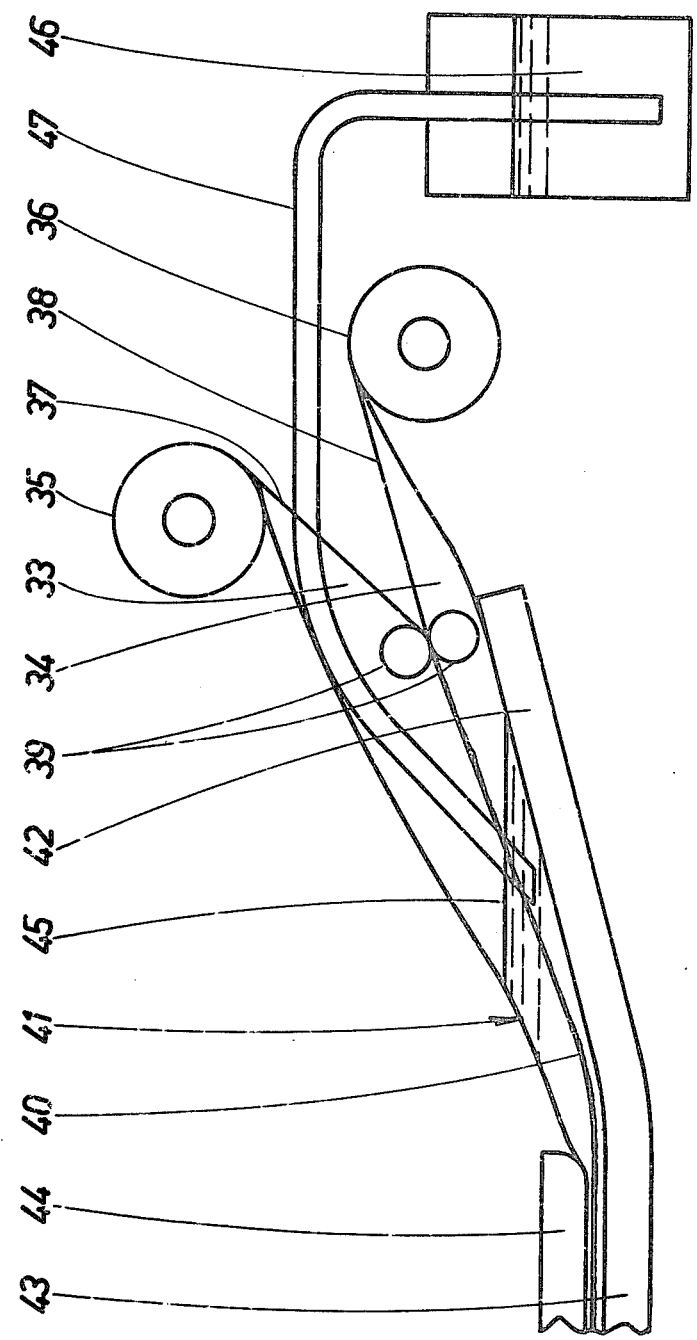
FIG. 9 is a diagrammatic view of a continuous tube molding apparatus.

FIG. 9 illustrates another way of continuously molding a layer. Two webs 33,34 are drawn off from rolls 35,36, respectively, and their ends (not shown) are sealed together. The webs are of a semi-permeable heat sealable material, such as cellulose hydrate, and the edges 37,38 of the respective webs pass between a pair of heated wheels 39 located towards each edge of the webs to form welded seams 40, thus defining a tubular mold 41.

This tubular mold 41 is led down an inclined support 42 and between a pair of parallel, horizontal supports 43,44 which are spaced apart by a distance which will determine the thickness of the mold and the layer which it contains.

The mold 41 is filled to a level 45 (which is above the level of the upper parallel support 44) with layer forming material brought from a reservoir 46 using a siphon tube 47.

The parallel supports 43,44 are preferably constituted as porous heating devices so as to assist evaporation of the solvent and they may, for example, be of porous plastic material.

The lower of those supports is preferably fixed and the upper support 44 may, if desired, be suspended on springs (not shown). After the layer has been fabricated, the mold forming film may be stripped away and a permanent support applied.

What is claimed is:

1. A method of forming a very uniform layer of intumescent material from a solution containing the intumescent material and a solvent which comprises the steps of forming the solution into a layer in a mold, contacting at least one major face of the solution layer with a wall of the mold comprising a semi-permeable film which is permeable over the area of that face substantially to the vapor phase only of said solvent, and effecting the escape of solvent simultaneously from both major faces of said layer including from at least one said major face by vapor diffusion through said wall so as to set the layer.

2. A method as defined in claim 1 wherein said semi-permeable film is held substantially rigid by a vapor permeable support during setting of the layer.

3. A method as defined in claim 2 wherein said support is rigid.

4. A method as defined in claim 2 wherein, after setting of the layer, said layer and said film are detached from said support.

5. A method as defined in claim 2 wherein said film is formed from a material taken from the group consisting of plastic, rubber and paper, which material has been treated to ensure its semi-permeability.

6. A method as defined in claim 2 wherein said film is formed from a polymer containing hydrophilic groups.

7. A method as defined in claim 6 wherein said polymer is selected from the group consisting of cellulose hydrate, cellulose butyrate, cellophane, polyvinyl alcohol, acetyl cellulose, ethyl cellulose and polydialkylsiloxane.

8. A method as defined in claim 1 wherein the outer face of said wall is subjected to reduced pressure to assist the layer to set.

9. A method as defined in claim 1 wherein said layer is formed as a sheet.

10. A method as defined in claim 1 wherein said mold having said wall is immersed in a bath of said solution and a reduced pressure is applied to the outer face of said wall to cause solvent vapor to migrate through said wall while it is immersed in the bath whereby a layer of material is deposited on said wall.

11. A method as defined in claim 1 wherein said layer is formed as a continuous web.

12. A method as defined in claim 11 wherein said solution is applied onto an upper generally horizontally travelling reach of an endless belt where the setting is effected prior to cutting the continuous web thus formed into sheets.

13. A method as defined in claim 12 wherein said upper reach is held rigid by tensioning said belt.

14. A method as defined in claim 12 wherein said upper reach travels over a rigid plate which supports it.

15. A method as defined in claim 12 wherein a semi-permeable film web is fed onto said belt before the solution is applied.

16. A method as defined in claim 11 wherein two film webs, of which at least one is semi-permeable, are drawn off and sealed together at their end and along each side to form a tubular mold, said solution is introduced into said tubular mold, said tubular mold is drawn down an incline to maintain a head of fluid and between two parallel support members against which main walls of the tubular mold are held by the internal pressure of the tubular mold due to the head of fluid, the speed of advance of the tubular mold and the length of said support members being such that setting of the layer is substantially complete with the layer exits from between the support members.

17. A method as defined in claim 16 wherein said support members define a horizontal path for said mold.

18. A method as defined in claim 1 wherein said intumescent material comprises hydrated sodium silicate.

19. A layer formed by the method according to claim 1.

20. A method of manufacturing a fire-screening glazing panel comprising at least one layer of intumescent material held between two plies, of which at least one supports said layer, said method comprising forming said layer by the method as defined in claim 1 and assembling said layer between said two plies.

21. A method as defined in claim 20 wherein said layer and said two plies are bonded together as a laminate.

22. A fire-screening glazing panel manufactured by the method as defined in claim 20.

* * * * *